United States Patent Office 3,154,565
Patented Oct. 27, 1964

3,154,565
CHROMENYL COMPOUNDS AND METHOD
OF PREPARING
Bruce O. Linn, Plainfield, Clifford H. Shunk, Westfield, and Karl Folkers, Plainfield, N.J., assignors to Merck & Co., Inc., Rahway, N.J., a corporation of New Jersey
No Drawing. Filed Mar. 22, 1962, Ser. No. 181,815
16 Claims. (Cl. 260—345.2)

This invention relates to improved methods of preparing chromenyl compounds. More particularly, it is concerned with a procedure for converting quinone compounds to the corresponding chromenol or chromenyl derivatives.

The chromenyl compounds obtained in accordance with this invention are useful as intermediates in the preparation of the corresponding chromanyl compounds which are useful antioxidants. The process of the present invention provides a convenient method whereby the chromenyl compounds can be readily obtained in high yield.

It is an object of the present invention to provide a new method of converting quinones to the corresponding chromenyl compounds. Other objects will be apparent from the detailed description of this invention hereinafter provided.

In accordance with this invention, it is now found that 2-methyl quinones having a β,γ-unsaturated isoprenoid group at the 3-position can be converted to the corresponding chromenyl compounds by reaction with sodium hydride. This reaction can be shown structurally as follows:

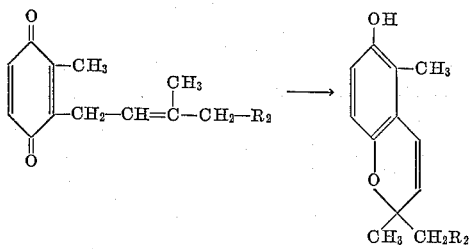

wherein $R_2$ represents hydrogen or a hydrocarbon group containing up to 45 carbon atoms. The 2-methyl quinone can also contain other substituents such as alkyl, alkoxy groups in positions 5 and 6, or the 5,6 bond can be part of an attached benzene ring such as a naphthoquinone.

Thus by this invention, quinones such as members of the vitamin $K_1$ group, for example vitamin $K_1$ and vitamin $K_{1(20)}$, coenzyme $Q_{10}$, coenzyme $Q_6$, coenzyme $Q_4$, hexahydrocoenzyme $Q_4$, coenzyme $Q_2$, coenzyme $Q_1$, 5,6-dimethyl quinones and the like can be converted to the corresponding chromenyl compounds. The reaction with these compounds can be shown as follows:

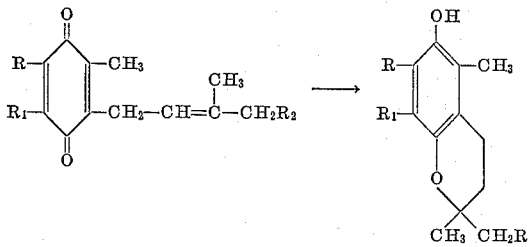

wherein R and $R_1$ represent methyl or methoxy and R and $R_1$ together represent CH=CH—CH=CH and $R_2$ is the same as above. The reaction is carried out by intimately contacting the quinone compound with sodium hydride and then recovering the chromenyl compound from the resulting reaction mixture. The reaction is most conveniently effected by heating the quinone with the sodium anhydride in the presence of a suitable inert solvent, for example, a hydrocarbon solvent such as benzene, toluene, xylene and the like. Generally, it is preferred to carry out the reaction in benzene and by heating the reaction mixture under reflux to complete the formation of the chromenyl intermediate.

In carrying out the reaction to obtain maximum yields of the desired chromenyl compound under optimum conditions, it is preferred to use an amount of sodium hydride which is not less than about one half by weight of the quinone compound being reacted. Although larger amounts of sodium hydride can be used, it is generally found that lower yields of the desired products are obtained.

The chromenol compound is recovered from the reaction mixture by acidifying the mixture with acetic acid, separating the solvent layer, and concentrating it to obtain the crude product. The product so obtained can be further purified by chromatography over adsorbents such as silica gel or a magnesium silicate. The chromenol is recovered from the adsorbent by elution with a suitable solvent such as 3% ether in isooctane.

In accordance with a further embodiment of this invention, the chromenols obtained by the reaction of the quinones with sodium hydride can be converted to the corresponding ester by reaction with an esterifying agent. Thus, after completion of the reaction of the quinone with the sodium hydride, an acylating agent such as a lower alkanoic acid anhydride, for example, acetic anhydride, can be added and the corresponding acetate ester can be recovered from the resulting reaction mixture. Similarly, the chromenol in the reaction mixture can be reacted with a phosphorylating agent such as phosphorus oxychloride or dibenzylchlorophosphonate. The phosphorylated intermediates are converted to the free phosphate by either hydrolysis in the case of phosphorylation with phosphorus oxychloride, or by hydrogenolysis in the case of phosphorylation with dibenzylchlorophosphonate to obtain the desired 6-chromanyl phosphate.

The chromenols and the esters thereof obtained in accordance with the present invention are useful antioxidants which can be utilized to inhibit the oxidation of various animal and vegetable fats and oils. Also, the chromenols can be converted to the corresponding chromanols by hydrogenation in the presence of a noble metal catalyst. The chromanols obtained in this manner are also antioxidants and can be utilized to inhibit the oxidation of fats and oils.

The following examples are used to illustrate the process of preparing chromenols, chromenyl derivatives and corresponding chromanyl compounds.

EXAMPLE 1

Chromenol of Coenzyme $Q_{10}$ [Ubichromenol; 7,8-Dimethoxy - 2,5 - Dimethyl - 2 - (4',8',12',16',20',24',28', 32',36' - Nonamethylheptatriaconta - 3',7',11',15',19', 23',27',31',35'-Nonaenyl)-6-Chromenol]

A 250 ml. three-necked round-bottomed flask was fitted with a mechanical stirrer, a nitrogen inlet tube and a condenser. Benzene (175 ml.) and coenzyme $Q_{10}$ (5.0 g.) were added and about 25 ml. of benzene was distilled through the condenser to dry the apparatus. A drying tube was placed on the condenser and the solution was cooled to room temperature (nitrogen atmosphere). Sodium hydride (3.0 g. of a 52% dispersion in oil) was added. The mixture was refluxed with stirring for two hours. It was then cooled in an ice bath and 100 ml. of cold 1 N acetic acid was added with stirring. The layers were separated and the benzene solution was washed with three portions of water (some ether was added to break the emulsion). The organic layer was dried over magnesium sulfate, filtered and concentrated under reduced pressure leaving 6.6 g. of residual oil. This was chromatographed over 600 g. of silica gel using 3% ether in isooctane as the eluant. The eluant in which the ratio of the absorbance at 275 mμ to that at 330 mμ was 2.4 to 2.9, was collected and concentrated under reduced pressure yielding essentially pure chromenol of coenzyme $Q_{10}$. It was crystallized from ethanol after treatment with decolorizing carbon giving material that melted at about 25–26°.

λ max.:                                              E, percent
330 mμ _____  40
282 mμ _____  92
275 mμ _____  97
232 mμ _____ 233

EXAMPLE 2

Chromenol of Coenzyme $Q_6$ [7,8-Dimethoxy-2,5-Dimethyl - 2 - (4',8',12',16',20' - Pentamethylheneicosa - 3',7',11',15',19'-Pentaenyl)-6-Chromenol]

To a 250 ml. round-bottomed flask fitted with a nitrogen inlet tube, a stirrer and a condenser were added 1.16 g. of coenzyme $Q_6$ and 150 ml. of benzene. A portion (50 ml.) of the benzene was distilled to dry the apparatus. The solution was cooled to room temperature and 0.46 g. of a 52% dispersion of sodium hydride in mineral oil was added. The mixture was refluxed with stirring for four hours. After cooling in an ice bath, 100 ml. of cold 1 N acetic acid was added with stirring. The layers were separated and the organic layer was washed with water, dried over sodium sulfate, filtered, and concentrated under reduced pressure giving 1.20 g. of an oil. This was chromatographed using 200 g. of silica gel. The product was eluted with 3% ether in isooctane. The eluate before the orange band contained the chromenol of coenzyme $Q_6$.

λ max.:                                              E, percent
330 mμ _____  50
281 mμ _____ 119
275 mμ _____ 126
232 mμ _____ 310

EXAMPLE 3

Chromenol of Hexahydrocoenzyme $Q_4$ [7,8-Dimethoxy-2,5 - Dimethyl - 2 - (4',8',12' - Trimethyltridecyl) - 6-Chromenol]

To a 100 ml. round-bottomed flask fitted with a nitrogen inlet tube, a stirrer and a condenser, were added 0.67 g. of hexahydrocoenzyme $Q_4$, 30 ml. of sodium dried benzene and 0.35 g. of a 52% dispersion of sodium hydride in mineral oil. The mixture was refluxed in a nitrogen atmosphere for two hours. After cooling in an ice bath, 50 ml. of cold 1 N hydrochloric acid was added with stirring. The layers were separated and the organic layer was washed with water, dried over sodium sulfate, filtered and concentrated under reduced pressure giving 1.0 g. of an oil. This was chromatographed using 100 g. of silica gel as the adsorbent. The column was eluted first with isooctane and then with isooctane containing 5% ether. The fraction before the orange band contained the chromenol of hexahydrocoenzyme $Q_4$.

λ max.:                                              E, percent
330 mμ _____  60
281 mμ _____ 144
274 mμ _____ 150
232 mμ _____ 357

Further purification of the above chromenol by chromatography using silica gel and 2% ether in isooctane yielded material with the following ultraviolet absorption characteristics:

λ max.:                                              E, percent
330 mμ _____  65
280 mμ _____ 150
274 mμ _____ 159
232 mμ _____ 382

EXAMPLE 4

6-Chromenyl Acetate of Vitamin $K_{1(20)}$ [2,5-Dimethyl-2-(4,8,12 - Trimethyltridecyl) - 2 - H - Naphtho[1,2 - b]-Pyran-6-Yl Acetate]

A mixture of 2 g. of vitamin $K_{1(20)}$, 1 g. of 54% sodium hydride dispersion, and 50 ml. of benzene was refluxed for two hours under a nitrogen atmosphere. The reaction mixture was cooled and 0.5 ml. of acetic anhydride was added. After about one hour, 1.3 g. of acetic acid was added dropwise and the reaction mixture was stirred and then filtered. The filtrate was concentrated, and the residual oil was dissolved in Skellysolve B and absorbed on silica gel. The column was developed with Skellysolve B and the product was eluted with Skellysolve B containing 1% ether to yield 2,5-dimethyl-2-(4,8,12-trimethyltridecyl)-2-H-naphtho[1,2-b]-pyran-6-yl acetate, $$\lambda_{max.}^{isooctane}\ 266\ m\mu\ (E_{1\ cm.}^{1\%}\ 646),\ 276\ m\mu\ (E_{1\ cm.}^{1\%}\ 830)$$

The nuclear magnetic resonance spectrum of the compound in carbon tetrachloride solution was in accord with the structure.

EXAMPLE 5

6-Chromanyl Acetate of Vitamin $K_{1(20)}$ [3,4-Dihydro-2,5-Dimethyl-2-(4,8,12 - Trimethyltridecyl)-2-H - Naphtho[1,2-b]-Pyran-6-Yl Acetate]

A solution of 123 mg. of 2,5-dimethyl-2-(4,8,12-trimethyltridecyl)2-H-naphtho[1,2-b]-pyran-6-yl acetate in 15 ml. of methanol was reduced over 100 mg. of 10% Pd on Darco. When the reduction was complete, the catalyst was removed by filtration, and the filtrate was concentrated to yield 3,4-dihydro-2,5-dimethyl-2-(4,8,12-trimethyltridecyl)-2-H-naphtho[1,2-b]-pyran-6-yl acetate, $$\lambda_{max.}^{isooctane}\ 245\ m\mu\ (E_{1\ cm.}^{1\%}\ 815)$$

The nuclear magnetic resonance spectrum of the compound in carbon tetrachloride solution is in accord with the structure.

EXAMPLE 6

6-Chromanol of Vitamin $K_{1(20)}$ [3,4-Dihydro-2,5-Dimethyl-2-(4,8,12 - Trimethyltridecyl)2-H-Naphtho[1,2-b]-Pyran-6-Ol]

A solution of 85 mg. of 3,4dihydro-2,5-dimethyl-2-(4,8,12-trimethyltridecyl)-2 - H - naphtho[1,2-b]-pyran-6-yl acetate in 5 ml. of anhydrous ether was refluxed with 7 mg. of lithium aluminum hydride for one hour. The reaction mixture was cooled and the excess lithium aluminum hydride was decomposed by the addition of a few drops of ethyl acetate. The mixture was acidified by the dropwise addition of 2.5 N HCl and a few ml. of water was added. The organic phase was separated, washed with water, dried over anhydrous sodium sulfate and concentrated in vacuo. 3,4-dihydro-2,5-dimethyl-2-(4,8,12-trimethyltridecyl)-2-H-naphtho[1,2-b]-pyran-6-ol was obtained as a colorless oil, $$\lambda_{max.}^{CCl_4}\ 2.76\mu,\ 2.95\mu;\ \lambda_{max.}^{isooctane}\ 249\ m\mu\ (E_{1\ cm.}^{1\%}\ 853),$$
$$324\ m\mu\ (E_{1\ cm.}^{1\%}\ 128),\ 338\ m\mu\ (E_{1\ cm.}^{1\%}\ 131)$$

The nuclear magnetic resonance spectrum of the product in acetone or carbon tetrachloride solution was in accord with the structure.

EXAMPLE 7

*Dibenzyl Phosphate of the 6-Chromenol of Vitamin $K_{1(20)}$ [O,O - Dibenzyl O-[2,5-Dimethyl-2-(4,8,12-Trimethyltridecyl)-2-H-Naphtho[1,2-b]Pyran-6-Yl] Phosphate]*

Two grams of vitamin $K_{1(20)}$ was dissolved in 25 ml. of anhydrous benzene. After the solution was put under a nitrogen atmosphere, 0.5 g. of a 54.5% sodium hydride dispersion was added and the mixture was refluxed for two hours. The solution was cooled to about 0° and a solution of 0.011 mole of dibenzyl-chlorophosphonate in 31 ml. of carbon tetrachloride was added. After the reaction mixture was stirred for one hour at room temperature, it was treated with 5% aqueous sodium bicarbonate. The organic phase was separated, washed with water, dried over anhydrous sodium sulfate, and concentrated in vacuo. The residual oil was dissolved in Skellysolve B and adsorbed on silica gel (100 g.). The column was eluted successively with Skellysolve B, Skellysolve B containing 1% ether, —10% ether and —25% ether.

The fraction eluted with 25% ether was adsorbed on silica gel (50 g.) from a Skellysolve B solution, and the column was developed with Skellysolve B. A fraction was eluted with Skellysolve B containing 10% ether to yield O,O-dibenzyl O-[2,5-dimethyl-2-(4,8,12-trimethyltridecyl)-2-H-naphtho[1,2-b]pyran-6-yl] phosphate, $\lambda_{max.}^{isooctane}$ 266 m$\mu$ ($E_{1\,cm.}^{1\%}$ 398); 276 m$\mu$ ($E_{1\,cm.}^{1\%}$ 498); $\lambda_{max.}^{Neat}$ 7.82–8.23$\mu$, 9.4–9.92$\mu$ The nuclear magnetic resonance spectrum of the product in carbon tetrachloride solution was in accord with the structure.

EXAMPLE 8

*Phosphate of the 6-Chromenol of Vitamin $K_{1(20)}$ [2,5-Dimethyl-2-(4,8,12 - Trimethyltridecyl)-2-H-Naphtho[1,2-b]-Pyran-6-Yl Phosphate]*

Two grams of vitamin $K_{1(20)}$ was dissolved in 25 ml. of anhydrous benzene and the solution was put under a nitrogen atmosphere. After 0.5 g. of a 53% sodium hydride dispersion was added, the mixture was refluxed for two hours. The solution was cooled to about 5° and a solution of 1 ml. of phosphorus oxychloride in 10 ml. of anhydrous benzene was added dropwise. After the reaction mixture had been stirred for about one hour at room temperature, it was acidified with 0.1 N HCl, and the organic phase was separated. The aqueous phase was washed with ether, and the combined benzene-ether extracts were dried over anhydrous sodium sulfate and concentrated in vacuo to yield 3 g. of residual oil. The product was dissolved in Skellysolve B and adsorbed on silica gel (235 g.). The column was eluted successively with Skellysolve B, Skellysolve B containing 2% ether, —10% ether, —25% ether, and finally with ether.

A 360-mg. portion of the fraction eluted with ethyl ether was adsorbed on silica gel (30 g.) from Skellysolve B solution, and a fraction was eluted with Skellysolve B to yield 2,5-dimethyl-2-(4,8,12-trimethyltridecyl)-2-H-naphtho[1,2-b]-pyran-6-yl phosphate, $\lambda_{max.}^{isooctane}$ 266 m$\mu$ ($E_{1\,cm.}^{1\%}$ 458), 276 m$\mu$ ($E_{1\,cm.}^{1\%}$ 513); $\lambda_{max.}^{CHCl_3}$ 2.8–3.1$\mu$, 7.5$\mu$

EXAMPLE 9

*6-Chromanyl Phosphate of Vitamin $K_{1(20)}$ [3,4-Dihydro-2,5-Dimethyl-2-(4,8,12 - Trimethyltridecyl)-2-H-Naphtho [1,2-b]-Pyran-6-Yl Phosphate]*

Four hundred and fifty-two milligrams of O,O-dibenzyl O-[2,5-dimethyl - 2 - (4,8,12-trimethyltridecyl)-2-H-naphtho[1,2-b]-pyran-6-yl] phosphate was dissolved in 15 ml. of glacial acetic acid and reduced over 750 mg. of 10% Pd on Darco. The theoretical consumption of hydrogen was essentially complete in about three hours; the catalyst was removed by filtration and washed with 10 ml. of glacial acetic acid. The combined filtrate and washings was concentrated in vacuo, and a 242-mg. portion of the residual glass was adsorbed on 10 g. of silica gel from Skellysolve B solution. Elution of the column with Skellysolve B yielded 3,4-dihydro-2,5-dimethyl-2-(4,8,12-trimethyltridecyl)-2-H - naphtho[1,6-b]-pyran-6-yl phosphate, M.P. 146–147.5°, $\lambda_{max.}^{ethanol}$ 242.5 m$\mu$ ($E_{1\,cm.}^{1\%}$ 750); $\lambda_{max.}^{CHCl_3}$ 2.8–3.9$\mu$ The nuclear magnetic resonance spectrum of the product in carbon tetrachloride solution was in accord with the structure.

Various changes and modifications of the invention can be made, and to the extent that such variations incorporate the spirit of this invention, they are intended to be included within the scope of the appended claims.

What is claimed is:

1. The process which comprises reacting a quinone of the formula

[structure of quinone with R, $R_1$, $CH_3$, $CH_2$—CH=C($CH_3$)—$CH_2R_2$]

wherein R and $R_1$ are the same and represent a member from the group consisting of methyl, methoxy and a substituent wherein R and $R_1$ together represent

—CH=CH—CH=CH— and $R_2$ is a member from the group consisting of hydrogen, $$\left( CH_2CH_2\overset{CH_3}{\underset{|}{C}H}CH_2 \right)_n H$$

and $$\left( CH_2CH=\overset{CH_3}{\underset{|}{C}}CH_2 \right)_n H$$

where *n* is an integer from one to nine, with sodium hydride to produce the corresponding chromenol of the formula

[chromenol structure with OH, R, $R_1$, $CH_3$, $CH_3$, $CH_2R_2$]

wherein R, $R_1$ and $R_2$ are the same as above.

2. A process for the preparation of a chromenol of the formula

[chromenol structure with OH, $CH_3O$, $CH_3O$, $CH_3$, $CH_3$, $CH_2R_2$]

wherein $R_2$ is a member from the group consisting of hydrogen $$\left( CH_2CH_2\overset{CH_3}{\underset{|}{C}H}CH_2 \right)_n H$$

and $$\left( CH_2CH=\overset{CH_3}{\underset{|}{C}}CH_2 \right)_n H$$

where $n$ is an integer from one to nine, which comprises reacting a compound of the formula

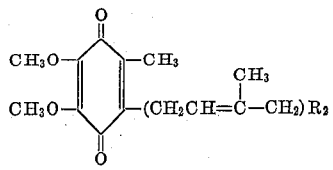

wherein $R_2$ is the same as defined above, with sodium hydride, and recovering said chromenol from the resulting reaction product.

3. A process for the preparation of a chromenol of the formula

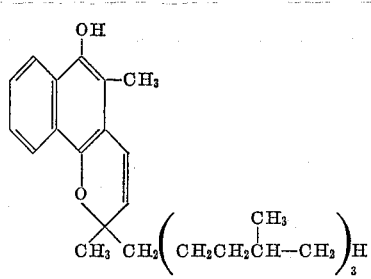

which comprises reacting vitamin $K_{1(20)}$ with sodium hydride, and recovering said chromenol from the resulting reaction mixture.

4. A process for the preparation of a chromenyl compound of the formula

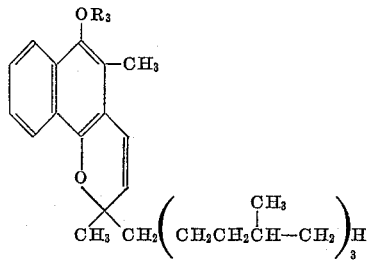

wherein $R_3$ represents a lower alkanoyl group, which comprises reacting vitamin $K_{1(20)}$ with sodium hydride, and treating the resulting reaction product with a lower alkanoic acid anhydride to produce said chromenyl compound.

5. A process which comprises reacting vitamin $K_{1(20)}$ with sodium hydride, treating the resulting reaction product with phosphorous oxychloride, acidifying this reaction mixture, and recovering the 6-chromenyl phosphate of vitamin $K_{1(20)}$.

6. A process which comprises reacting vitamin $K_{1(20)}$ with sodium hydride, treating the resulting reaction product with dibenzylchlorophosphonate, and recovering the dibenzylphosphate of the 6-chromenol of vitamin $K_{1(20)}$ from the resulting reaction mixture.

7. The process which comprises hydrogenating the dibenzylphosphate of the 6-chromenol of vitamin $K_{1(20)}$ in the presence of a noble metal catalyst to produce the 6-chromanyl phosphate of vitamin $K_{1(20)}$.

8. A compound of the formula

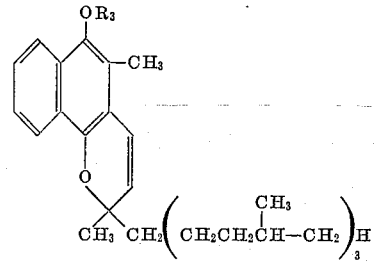

wherein $R_3$ represents a member from the group consisting of hydrogen, lower alkanoyl radicals, phosphate and dibenzylphosphate.

9. The 6-chromenyl acetate of vitamin $K_{1(20)}$.
10. The 6-chromenol of vitamin $K_{1(20)}$.
11. The 6-chromenyl phosphate of vitamin $K_{1(20)}$.
12. The dibenzylphosphate of the 6-chromenol of vitamin $K_{1(20)}$.

13. A compound of the formula

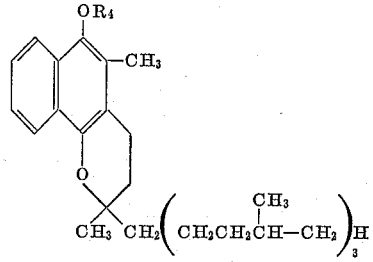

wherein $R_4$ represents a member from the group consisting of hydrogen, lower alkanoyl, and phosphate.

14. The 6-chromanol of vitamin $K_{1(20)}$.
15. The 6-chromanyl phosphate of vitamin $K_{1(20)}$.
16. The 6-chromanyl acetate of vitamin $K_{1(20)}$.

References Cited in the file of this patent
UNITED STATES PATENTS

| | | |
|---|---|---|
| 2,270,634 | Isler | Jan. 20, 1942 |
| 2,421,812 | Smith et al. | June 10, 1947 |
| 2,682,473 | Thompson et al. | June 29, 1954 |

UNITED STATES PATENT OFFICE
CERTIFICATE OF CORRECTION

Patent No, 3,154,565                          October 27, 1964

Bruce O. Linn et al.

It is hereby certified that error appears in the above numbered patent requiring correction and that the said Letters Patent should read as corrected below.

Column 1, lines 55 to 65, the last formula should appear as shown below instead of as in the patent:

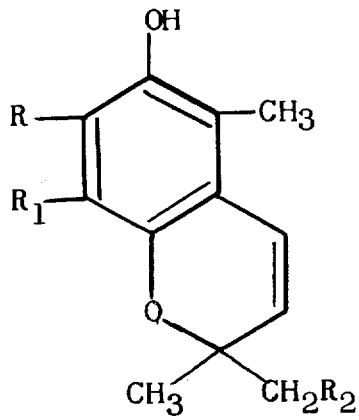

column 6, lines 55 to 65, the formula should appear as shown below instead of as in the patent:

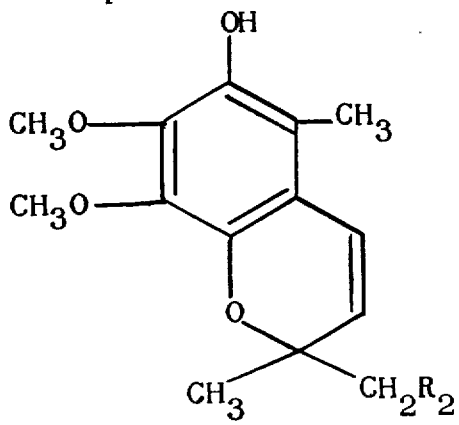

Signed and sealed this 20th day of April 1965.

(SEAL)
Attest:

ERNEST W. SWIDER                        EDWARD J. BRENNER
Attesting Officer                       Commissioner of Patents